(12) United States Patent
Cheng

(10) Patent No.: US 9,958,123 B2
(45) Date of Patent: May 1, 2018

(54) SYSTEM FOR RESEMBLING AN OPEN CANDLE FLAME

(71) Applicant: Universal Candle Company Limited, Hong Kong (HK)

(72) Inventor: Chak-yin Cheng, Hong Kong (HK)

(73) Assignee: Universal Candle Company Limited, Hong Kong (HK)

(*) Notice: Subject to any disclaimer, the term of this patent is extended or adjusted under 35 U.S.C. 154(b) by 0 days. days.

(21) Appl. No.: 15/664,787

(22) Filed: Jul. 31, 2017

(65) Prior Publication Data

US 2018/0010750 A1    Jan. 11, 2018

Related U.S. Application Data

(63) Continuation of application No. 15/387,140, filed on Dec. 21, 2016, now Pat. No. 9,719,643.

(60) Provisional application No. 62/343,143, filed on May 31, 2016.

(51) Int. Cl.
| | |
|---|---|
| *F21V 5/00* | (2018.01) |
| *F23D 3/16* | (2006.01) |
| *F21S 10/04* | (2006.01) |
| *F21S 6/00* | (2006.01) |
| *G02B 1/04* | (2006.01) |
| *F21V 14/02* | (2006.01) |
| *F21V 14/06* | (2006.01) |
| *F21L 4/02* | (2006.01) |

(52) U.S. Cl.
CPC .............. *F21S 10/043* (2013.01); *F21L 4/02* (2013.01); *F21S 6/001* (2013.01); *F21S 10/046* (2013.01); *F21V 14/02* (2013.01); *F21V 14/06* (2013.01); *G02B 1/041* (2013.01); *G02B 1/045* (2013.01)

(58) Field of Classification Search
CPC ........ F21S 10/043; F21S 6/001; F21S 10/046; F21L 4/02; G02B 1/041; G02B 1/045; F21V 14/06; F21V 14/02
USPC .................................. 362/555, 569
See application file for complete search history.

(56) References Cited

U.S. PATENT DOCUMENTS

| | | | | |
|---|---|---|---|---|
| 3,639,749 | A * | 2/1972 | Beckman | F21S 10/04 362/392 |
| 9,541,247 | B2 * | 1/2017 | Patton | F21S 10/046 |
| 9,719,643 | B1 * | 8/2017 | Cheng | F21S 10/043 |

(Continued)

*Primary Examiner* — Bao Q Truong
*Assistant Examiner* — Glenn Zimmerman
(74) *Attorney, Agent, or Firm* — Spruson & Ferguson (HK)

(57) ABSTRACT

A system simulating an open candle flame is provided in the present invention. In a preferred embodiment, the present system comprises a gyro-levitation unit including two spinning wheels with axes mutually perpendicular to each other to allow a two-degree of rotational freedom resembling the open candle flame motion caused by air flow in its surrounding environment. A mechatronics based actuator made of a bi-metal is employed to disturb the equilibrium of the gyroscope by exerting an actuating force against the gyro-levitation unit. Electric current controlled by a dedicated electronic unit flowing through the actuator allows reciprocal linear motion aligned with the visible light pattern of the candle flame. Varying light intensity of the candle flame is obtained as a combination of two light sources with one transmitted to a flame display through an optical device by total internal reflection and another one by projecting on its sideway.

12 Claims, 7 Drawing Sheets

(56) References Cited

U.S. PATENT DOCUMENTS

2006/0034100 A1* 2/2006 Schnuckle ................ B44C 5/06
362/161
2016/0290579 A1* 10/2016 Au ........................ F21S 10/046

* cited by examiner

SYSTEM FOR RESEMBLING AN OPEN CANDLE FLAME

CROSS-REFERENCE TO RELATED APPLICATIONS

The present application is a continuation-in-part application of U.S. patent application Ser. No. 15/387,140, entitled SYSTEM FOR RESEMBLING AN OPEN CANDLE FLAME, which was filed on Dec. 21, 2016, and is hereby incorporated by reference in its entity.

FIELD OF THE INVENTION

The present invention relates, in general, to methods and systems for simulating an open candle flame capable to incorporate user specific desires. In particular, the present invention relates to methods and systems for simulating visible light pattern and associated motion of an open candle flame with an aid of an integral structural design comprising electronic and mechanical control units incorporated therein to simulate the flame, and optical means for guiding light from at least one light source to a flame display.

BACKGROUND OF THE INVENTION

An open candle flame observes the basic physics in which its flame is seen as the visible, gaseous part of a fire. It is caused by a highly exothermic reaction taking place in a thin zone. When the candle is lighted, the fuel molecules in the candle wax are allowed to vaporize. At that state, they can then readily react with oxygen in the air, which gives off enough heat in the subsequent exothermic reaction to vaporize yet more fuel, thus sustaining a consistent flame. Sufficient energy in the flame will excite the electrons in some of the transient reaction intermediates which results in the emission of visible light as these substances release their excess energy. The chemical kinetics occurring in the flame is very complex and involves typically a large number of chemical reactions and intermediate species, most of them are radicals.

The challenge of the open candle flame simulation lies on the fidelity to resemble the subtle concept that candles burning with different flames have many different meanings and functions. The way that a candle burns can hold hidden significance as they can shine bright or glow dull in different situations like ceremonial, ritualistic, symbolic and utilitarian or all at the same time.

There have been some similar simulated candles in the technical field. For example, in U.S. Pat. No. 6,616,308, an imitation candle apparatus made from translucent material like paraffin having light transmissive properties is provided. Said imitation candle apparatus comprises a light diffusing body having permanent exterior surfaces including an upper surface with a depressed center section which appears reduced by melting, a cavity within the light diffusing body, and a small high density light source within the cavity to illuminate from below the bottom of the depressed center section more brightly than the other surfaces of the light diffusing body. It may have a light-sensing function which can turn the light off during day time and a flicker circuit which enables three to four distinct light levels that vary in a pseudo-random manner in order to provide a realistic variation of light output akin to a candle flame being disturbed by gentle air currents. Because the light source body of this patent is placed near the surface in the cavity and is from a small area, the light source is required to be super bright such that the light can be diffused throughout the body of the candle. It also can only vary the brightness level of the light source by varying the current to the LED under one or more low frequency oscillators. However, the light pattern of a candle flame cannot be simulated by that apparatus.

In U.S. Pat. No. 7,837,355, an apparatus creating flickering flame effect is provided including a housing incorporated with a time varying electromagnetic field driven mechanism to drive a first pendulum member with magnets on both ends in order to interact with the mechanism to generate a first pendulum movement followed by interacting with a second pendulum member having a magnet in order to generate a magnetic coupling effect on a flame silhouette extended from the second pendulum member. A light source is adapted to transmit light to the flame silhouette. The direction, magnitude, and frequency of the movement of the first and second pendulum members is limited by various factors including gravity, the magnitude and frequency of the time varying electromagnetic field for driving the mechanism, orientation of the magnet(s) on the first and second pendulum members, the mass, shape and size of the first and second pendulum members, any additional element intervening the movement of the pendulum, air resistance acting on the motion of the pendulum, etc. To drive the movement of the flame silhouette, that apparatus requires complex interactions between the drive mechanism, two pendulums, and any other intervening element, which makes it complicated in manufacturing and in operation.

In U.S. Pat. No. 8,070,319, which is under a continuation-in-part application of U.S. Pat. No. 7,837,355, it was further provided a single stage embodiment with one pendulum member, and an embodiment of a two-stage housing with a housing-contained lighting assembly and sidewall magnets for shaping and effecting movement of the flame body or the second pendulum member. According to one implementation method of the single stage embodiment, it was provided that there can be one or more than one light sources that may be aligned with each other. When the flame silhouette moves in normal operation with the connected pendulum member, its angle with respect to the light source(s) and the intensity of the reflected light changes continuously and in a complex, kinetic manner. In the two-stage embodiment, it was provided that the housing-contained lighting assembly can provide a beam of light about the size/shape of spot on the flame silhouette. It was also provided that the sidewall magnets are configured to provide a second kinetic movement to the upper pendulum member, in addition to the kinetic movement due to the interaction with the lower or first pendulum member resulted from the time-varying magnetic filed driven mechanism. The sidewall magnets can be modified in terms of the number of magnets, their position in the housing with respect to the upper pendulum member, their shape, etc., in order to result in a static magnetic field that interacts with the dynamic magnetic field to result in the desired movement of the flame body. The additional lighting assembly and sidewall magnets in the two-stage embodiment of this patent may provide enhanced lighting effect and motion patterns more resembling to an actual open flame, but still the problems are limited by the factors that are inherent from the magnetic field driven mechanism of the original design. The new embodiments in this patent are still complex in structure, leading to complications in manufacturing and operation. In U.S. Pat. No. 8,342,712, which is a continuation-in-part application of U.S. Pat. No. 8,070,319, it was further provided a light engine controller to control at least two lighting devices/assemblies which provide light on opposite sides of the flame silhouette or on the same side thereof. The at least two lighting devices/assemblies can provide the same or different colors of light or can be monochromatic or multi-color light source. The light engine controller can control brightness or intensity of light from the lighting devices/assemblies and provide driving or control signals. The controller may include a processor and a power supply, wherein the processor may manage a memory containing flame lighting program that is executable by the processor to cause the processor to transmit control signals for driving or operating the various effects of the light source from the lighting devices/assemblies. The simulation algorithm(s) of the program according to different embodiments of this patent appear to be more focused on varying the brightness/intensity of the two lighting devices/assemblies in order to result in the desired coloring effect over time. Although the controller is said to be replaceable by manual controls, it appears that either the program pre-installed in the controller or manual controls is not capable to provide a corresponding visible light pattern to align with a reciprocal motion of the flame body with respect to air current flowing through the flame body. In other words, there is no correlation between the changing coloring effect and the motion of the flame body in this series of US patents.

Therefore, there is an unmet need in the art for a flameless candle resembling a burning candle with different flame patterns by sensing and responding to the change of the air current of its surroundings.

SUMMARY OF THE INVENTION

Accordingly, one objective of the present invention is to replicate visible light pattern and associated motion of an open candle flame by a flameless candle system with an integral structural design comprising electronic and mechanical units incorporated therein to simulate the open candle flame, and an optical means for guiding at least one light source to a flame display. There are two implementation embodiments provided in the present invention.

In the first implementation embodiment, the system of the present invention comprises a holder for housing a gyro-levitation structure, a mechatronics based actuator, a first light source, an optical device for guiding light from a second light source, and a weight; a base for housing a processor, a power supply and said second light source. The gyro-levitation structure comprises two spinning wheels with orthogonal axis of rotation, where each of them has one axis of rotation which is free to assume any orientation by itself. In an embodiment, the gyro-levitation structure comprises an outer gimbal and an inner gimbal with pivotal axes which are mutually perpendicular to each other. The outer gimbal is mounted on the holder to pivot about an axis in its own plane and possesses one degree of rotational freedom. The inner gimbal is mounted in the outer gimbal of the gyro-levitation structure so as to pivot about an axis in its own plane that is perpendicular to the pivotal axis of the outer gimbal, and possesses two degrees of rotational freedom resembling an open candle flame motion in open space.

In the first implementation embodiment of the present invention, the gyro-levitation structure is configured as a frame to drive the movement of a candle flame shape sheet or membrane or display for displaying the simulated flame pattern generated directly by one of the two light sources or indirectly from the guided light source from the optical device or a combination thereof. The candle flame display is connected to said optical device at one end while the other end of said optical device is a receiving end of the light from the second light source which is positioned on the base where the processor and the power supply are housed. The receiving end of the light from the second light source comprises a convex lens for generating a more focused light to be transmitted through the optical device. In the preferred embodiment, the optical device includes a light guide made of optical grade material such as acrylic resin, polycarbonate, epoxies, and/or other optical lighting materials. In other embodiment, the first and second light sources are light-emitting diode (LED) varying in size, shape, color and brightness. Variation in brightness of the first and/or second light sources can be controlled digitally by using pulse width modulation (PWM). Preferably, the brightness of the first and/or second light sources is varied by using a controlled signal generator built in said processor. The first light source is preferably mounted on an interior sidewall of the holder to provide light from sideway of the flame display while the second light source is positioned on the base to provide an upward light signal through total internal reflection inside the light guide to the flame body. In the first implementation embodiment, the mechatronics based actuator is configured to provide a dynamic motion to the flame body by disturbing the equilibrium of the gyro-levitation structure. In the preferred embodiment, the mechatronics based actuator is in a wire form and both ends are mounted on the sidewall of the holder in opposite position to each other as pivots. The mechatronics based actuator is made of a bi-metal material capable to contract and expand when temperature is changed. One of the suitable candidates for said bi-metal material is nickel-titanium alloy built in a wire form and in combination of different crystal structures of nickel and titanium. In a sample size of 0.076 mm diameter wire, it is capable to be shortened in length by about 5% in 1 s for a let-through current of 200 mA. It is capable to return to its original length after the electric current is cut off for allowing its temperature to cool down. By using the bi-metal material as such to make the mechatronics based actuator and applying an on-off duty cycle type of electric current to the actuator, the length of the wire-like structure can vary in order to disturb the equilibrium of the gyro-levitation structure. The degree and frequency of the actuating force exerted by the mechatronics based actuator may depend on the oscillation frequency and magnitude of the electric current applied to the mechatronics based actuator. To provide such on-off duty cycle type of electric current, the processor comprises a controlled signal generator so as to manipulate the on-off duty cycle of the electric current generated by the power source to the mechatronics based actuator. In a preferred embodiment, the random number generator for controlling the on-off duty cycle of the electric current to the mechatronics based actuator is the same generator for digitally controlling the brightness of the first and/or second light sources. In other words, the electric current flowing through the mechatronics based actuator allows reciprocal linear motion which is aligned with the visible light pattern displayed on the flame body managed by the same signal generator of the processor. In other embodiment, the signal generator for controlling the on-off duty cycle of the electric current to the mechatronics based actuator is different from that for digitally controlling the brightness of the first and/or second light sources. In the first implementation embodiment, the mechatronics based actuator is positioned beneath the weight which is close to the end of the optical device where the light from the second light source is received.

In the second implementation embodiment of the present invention, the system comprises the same electronic and mechanical components as in the first implementation embodiment except that the gyro-levitation structure is absent. Another structural difference is that the mechatronics based actuator's position in the holder according to the second implementation embodiment is relatively higher than that according to the first implementation embodiment, with respect to the base. The mechatronics based actuator in the second implementation embodiment is preferably positioned above the weight. In the embodiment that the mechatronics based actuator is in a wire form and both ends thereof are mounted on sidewall of the holder in opposition position to each other, the optical device is configured to have an additional projection that allows the horizontal movement of the wire along the projection in order to achieve a two-axis pendulum motion pattern towards the flame display, as compared to the three-axis cone-shape pendulum motion achieved by the combination of the gyro-levitation structure with the mechatronics based actuator according to the first implementation embodiment of the present invention.

In the third implementation embodiment of the present invention, the system for resembling an open candle flame comprises a base, the base comprises a processor and a power source; a candle frame unit, the candle frame unit includes an upper flame display portion and a lower flame display portion; a supporting plate on which the candle frame unit is mounted; a truncate-cone-shape (TCS) helical spring support unit attached to the base at one end and to the supporting plate at the other end; a first light source within the lower flame display portion, such that the first light source directs illumination to the candle frame unit; a second light source around the lower flame display portion and on the supporting plate, such that the second light source projects illumination to the candle frame unit, wherein a complete flame image including an image of flame and an image of candlewick is displayed on the candle frame unit based on a combination of illuminations from the first light source and the second light source; a mechatronics based actuator associated with the TCS helical spring support unit and configured to provide a push-pull triggering force for disturbing the equilibrium of the TCS helical spring support unit resulting a dynamic motion of the candle frame unit; and a holder attached to the base and enclosing the TCS helical spring support unit and at least part of the candle frame unit, wherein the mechatronics based actuator, the first light source and the second light source are powered by the power source and modulated by the processor such that the dynamic motion of the candle frame unit and the variation of brightness and/or color of the flame image can be aligned. In some further aspects, the system further comprises a light confinement device attached to the first light source and within the lower flame display unit, the light confinement device confines illumination from the first light source to the candle frame unit, and the light confinement device is made from optical grade material selected from a group consisting of acrylic resin, polycarbonate, epoxies, polymethylmethacrylate (PMMA), polystyrene (PS), and acrylonitrile butadiene styrene (ABS). In some further aspects, the mechatronics based actuator is made of a bi-metal material. In some further aspects, the bi-metal material comprises a nickel-titanium alloy configured in a wire form made by different crystal structures of nickel and titanium. In some further aspects, the processor comprises a signal generator, the signal generator provides a first control signal to control an on-off duty of electric current to the mechatronics based actuator for controlling the dynamic motion of the candle frame unit, and a second control signal to control the brightness and/or color of the first and/or second light source. In some further aspects, the first and second control signals are generated based on pseudo-random numbers, pseudo-noise sequences, digital counters or whitening sequences. In some further aspects, the controlled signal generator further comprises a voltage regulator for stabilizing an input to a peripheral interface controller (PIC) for controlling the on-off duty cycle of electric current. In some further aspects, the upper flame display portion of the candle frame unit comprises an illumination membrane consisting of a violet-darkish bottom zone, a yellowish zone in the middle and an incomplete combustion zone at the top, and the lower flame display portion of the candle frame unit mimics a candlewick.

DETAILED DESCRIPTION OF THE INVENTION

Figure 1:
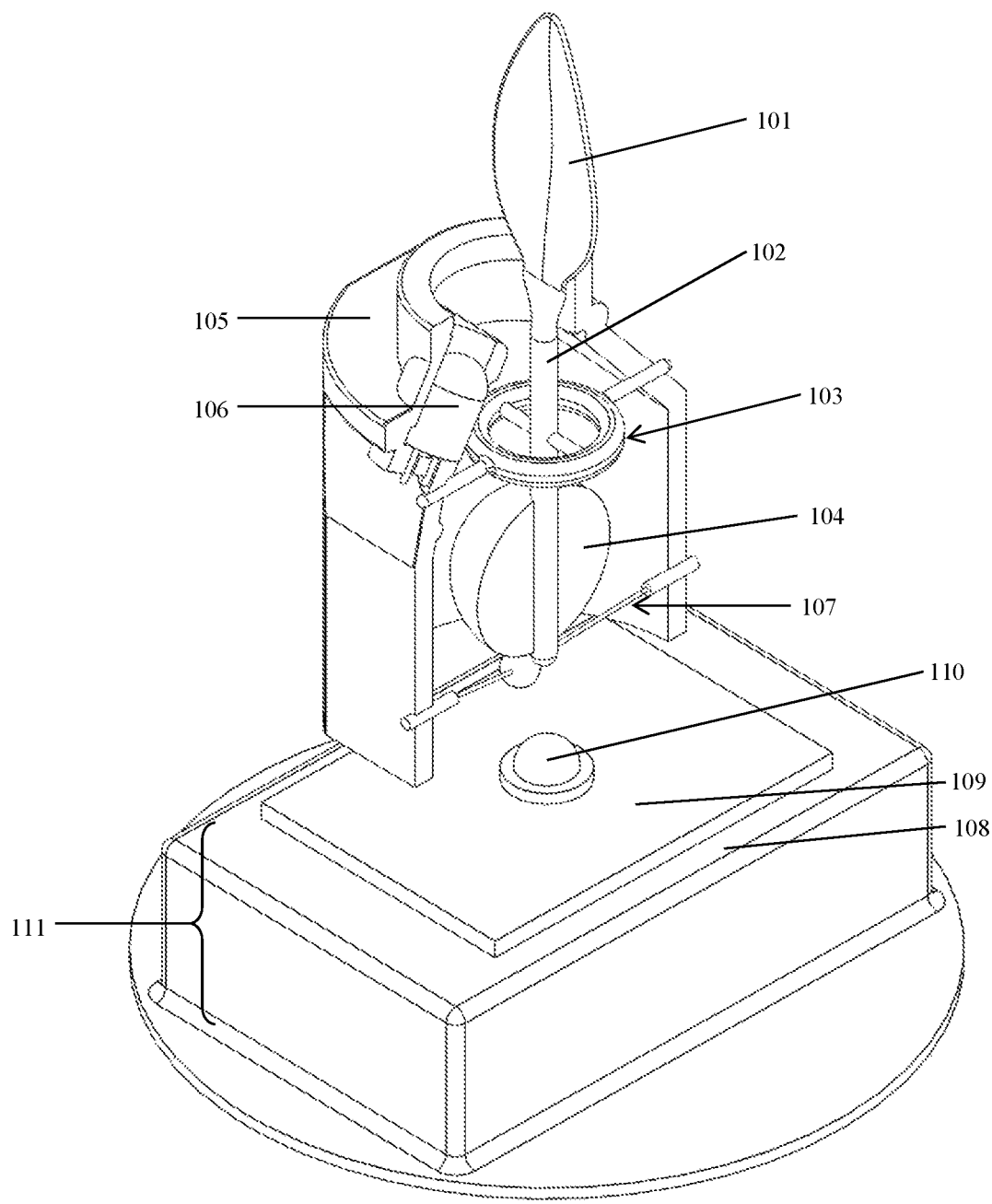
FIG. 1 is a cutaway perspective view of the flameless candle depicting the structure thereof according to the first implementation embodiment of the present invention.

Referring to the first implementation embodiment of the present invention as shown in FIG. 1, the flameless candle system comprises a holder 105 and a base 111. The holder 105 serves as a housing and comprises a flame display 101, an optical device 102, a gyro-levitation unit 103, a weight 104, a first light source 106, and a mechatronics based actuator 107. The base 111 comprises a power source 108, a processor 109 and a second light source 110. One end of the optical device 102 is physically connected to the flame display 101 and another end of the optical device is physically connected with the weight 104. The mechatronics based actuator 107 is positioned below the weight 104 and at a space between the optical device 102 and the second light source 110. The gyro-levitation unit 103 is physically mounted on sidewall of the holder 105 and the optical device 102, respectively, and therefore it acts like a frame to embody the optical device 102. Said gyro-levitation unit 103 comprises an outer gimbal and an inner gimbal which are two spinning wheels with orthogonal axis of rotation. The outer gimbal is mounted on the holder 105 and it assumes a degree of free motion of any orientation. As it also provides a pivotal axis to support the inner gimbal, the two-degree of mutually perpendicular motion so formed is one of the main features of the present invention by which the gyro-levitation unit 103 is geared to drive the flame display 101. In operation, the gyro-levitation unit 103 according to the first implementation embodiment of the present invention enables a cone-shape of solid angle type of pendulum motion which is used to resemble the open candle flame motion by air flow in its surroundings.

Figure 3:
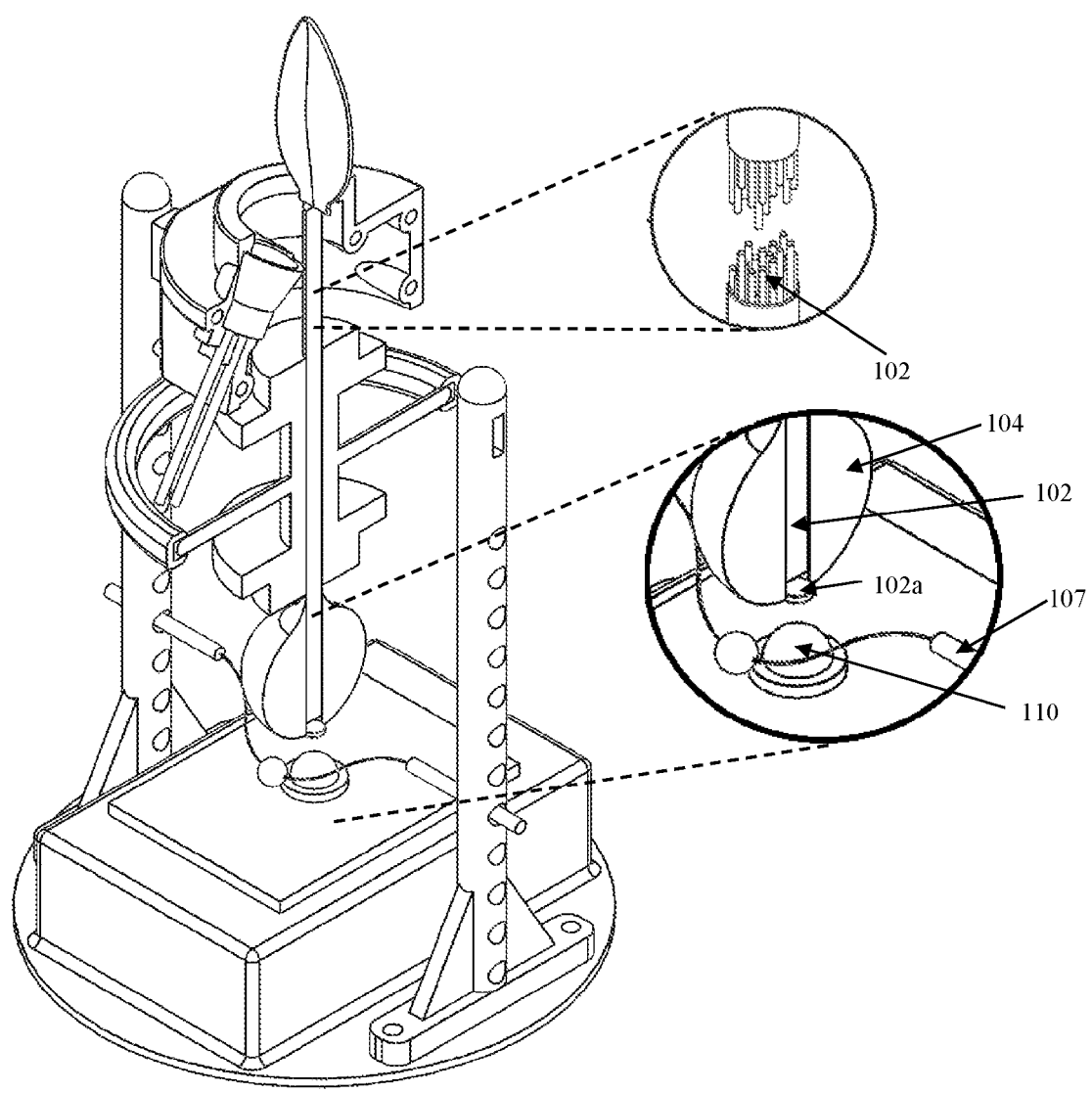
FIG. 3 is another cutaway perspective view of the flameless candle depicting the structure thereof according to the first implementation embodiment of the present invention.
Figure 6A:
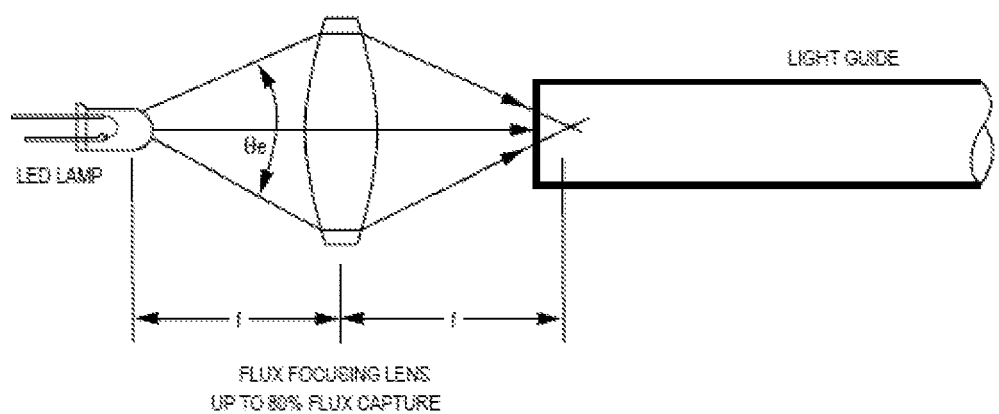
FIGS. 6A and 6B are schematic diagrams showing (A) the basic principle of using the light guide to guide the light from an LED light source and (B) a working model of the LED being inserted into a light guide to form the optical device according to an embodiment of the present invention.
Figure 6B:
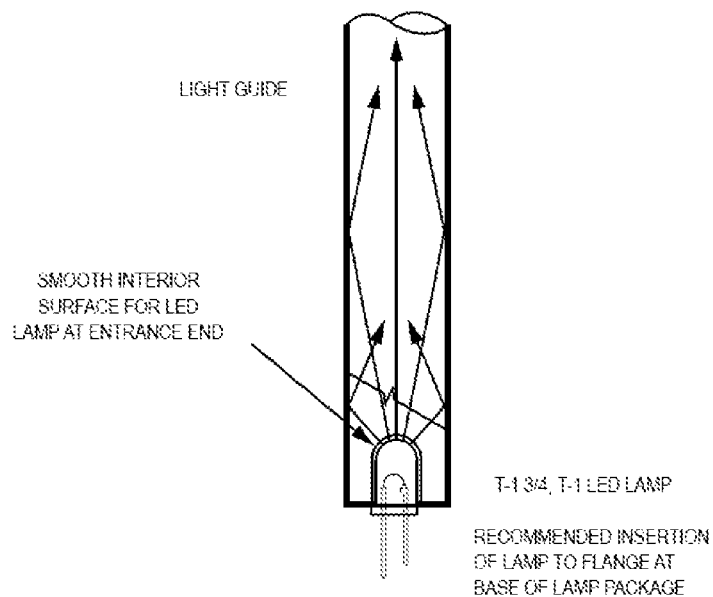

The mechatronics based actuator 107 is another key innovative feature in the present invention. It makes use of the properties of a bi-metal wire such as nickel-titanium alloy, also known as Nitinol, built by making use of combination of crystal structures from the nickel and titanium metals. The explanation for these structural changes lies at the atomic level with its shape changes as a result of the rearrangement of the crystal structures in the solid. It is able to "contract" by approximately 5% when an electric current of about 200 mA is applied and then "expand" to return to its full length again once it is cooled down, or when it is disconnected from the power source. A "to-and-fro" spinning dynamic motion of the actuator 107 initiated by an on-off duty cycle type of electric current can disturb the equilibrium of the gyro-levitation unit 103. This on-off duty cycle type of electric current can be controlled by a dedicated electronic controller. Another innovative feature is to realize the candle flame by using light guide techniques together with the traditional light projection principles. The first light source 106, which is preferably a LED, is digitally controlled by using Pulse Width Modulation (PWM) technique for controlling the brightness of the flame and its flickering effect is created by using synchronized control signal generated in line with the motion control. The second light source 110, which is also preferably a LED, is associated with the optical device 102, which is preferably a light guide, to transport the LED light from the second light source up to the lower part of the flame display 101. FIG. 3 shows an enlarged view of the structure of the light guide 102. At the end where it receives the light from the second light source 110, the light guide 102 comprises a convex lens 102a for seek of producing a focused light before transmitting the light into the light guide 102. The light guide 102 is made of acrylic resin material and the light transmission effectiveness can be taken care by either keeping a total internal reflection of the light flux (as shown in FIG. 6A) or by coupling the LED source into the light guide (as shown in FIG. 6B). The light from the light source is transmitted through the light guide by means of total internal reflection. Light guides are designed to be made of optical grade materials such as acrylic resin, polycarbonate, epoxies, or other optical lighting materials such as polymethylmethacrylate (PMMA), polystyrene (PS), and acrylonitrile butadiene styrene (ABS).

Figure 2:
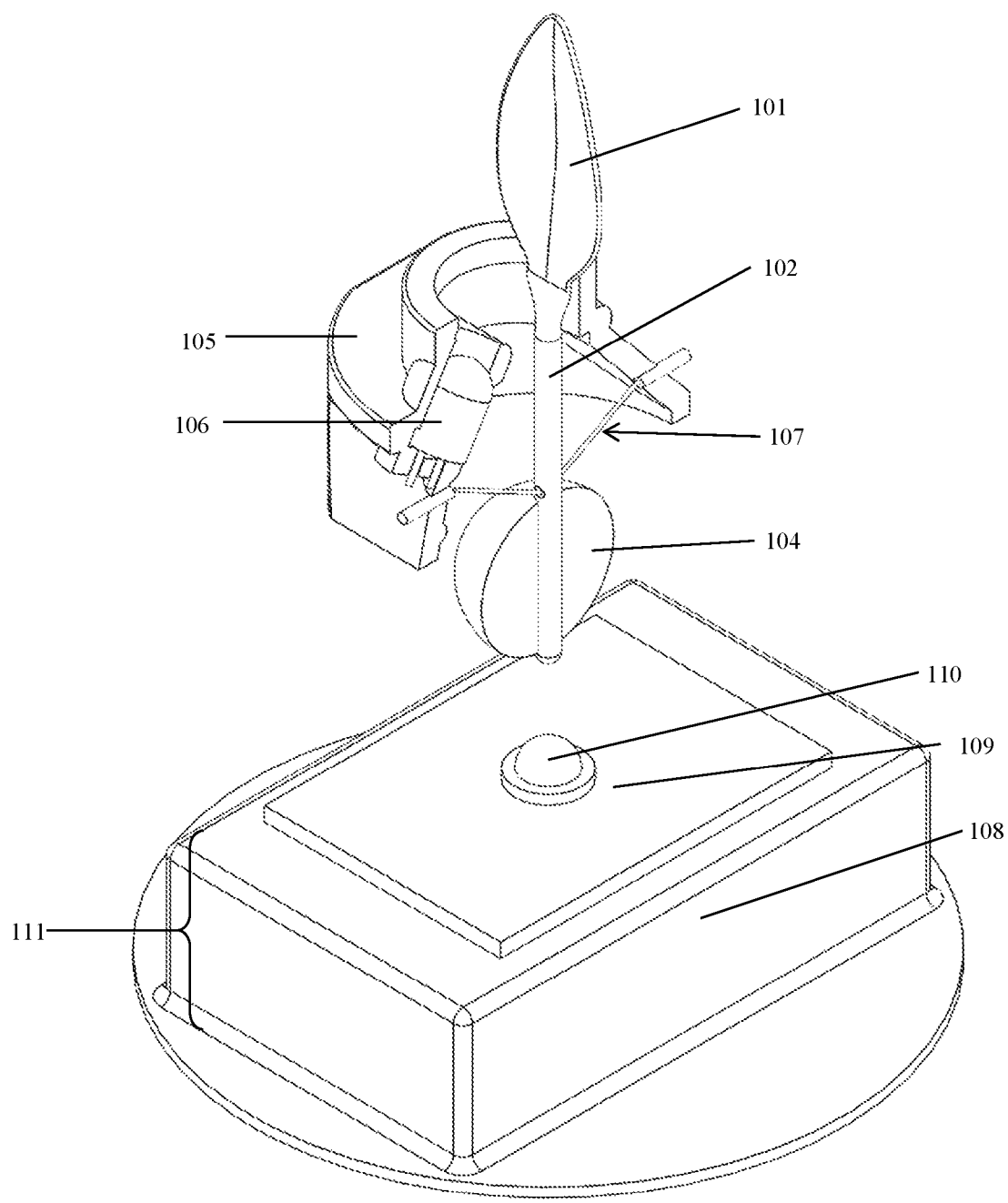
FIG. 2 is a cutaway perspective view of the flameless candle depicting the structure thereof according to the second implementation embodiment of the present invention.
Figure 4:
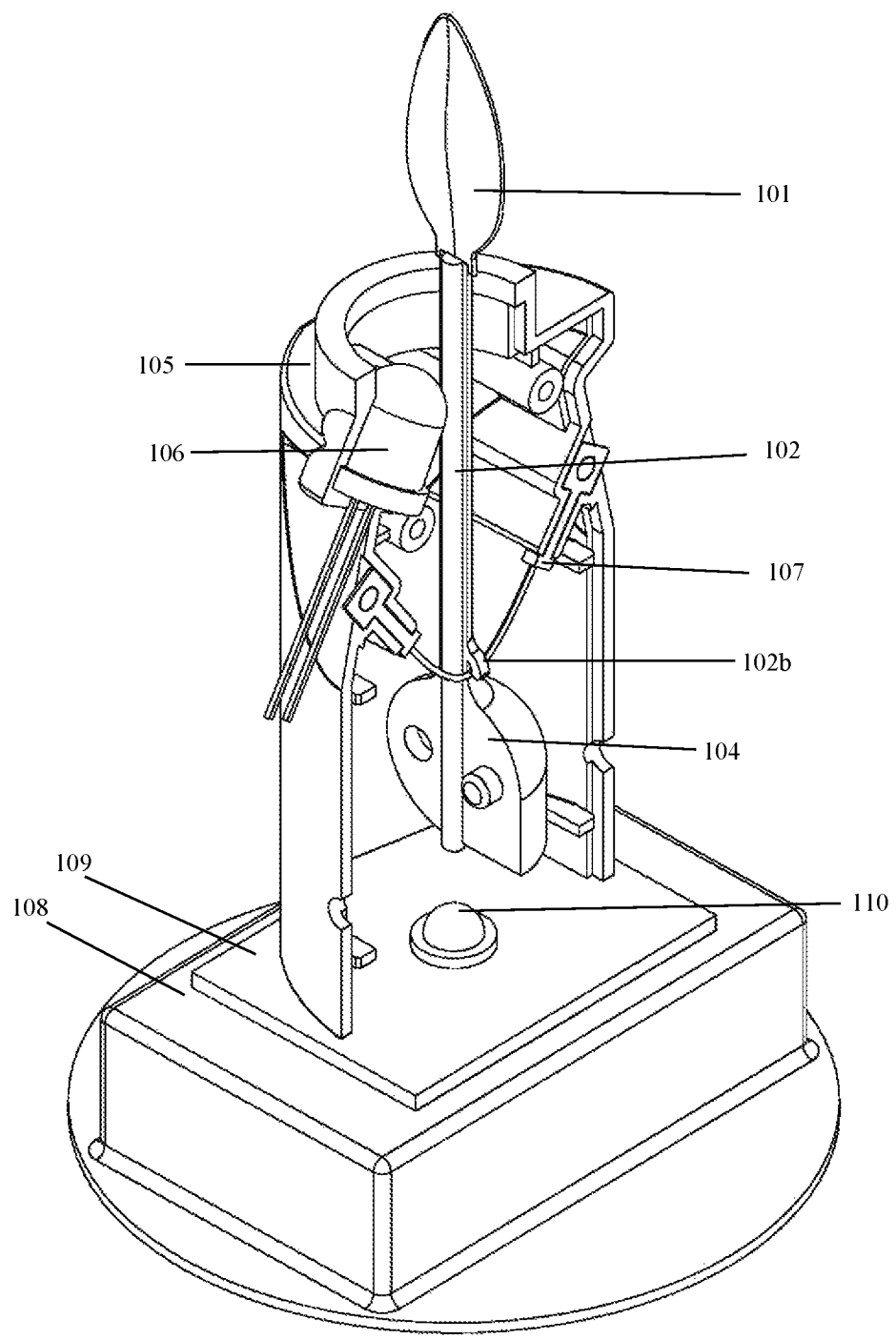
FIG. 4 is another cutaway perspective view of the flameless candle depicting the structure thereof according to the second implementation embodiment of the present invention.

FIG. 2 shows the second implementation embodiment of the present invention, which is a simplified version of the first implementation embodiment, in which a limited two-degree of motion is effected dedicated slackness in the mechatronics based actuating wire 107. The system according to the second implementation embodiment does not comprise said gyro-levitation unit 103 as in the first implementation embodiment. Accordingly, the mechatronics based actuator 107 plays the role of the gyro-levitation unit as in the first implementation embodiment to exert dynamic motion on the flame display but the degree of motion is limited to two-degree because of the configuration. In the second implementation embodiment, both ends of the mechatronics based actuator 107 are mounted at the sidewall of the holder 105 as pivots. As shown in FIG. 4, the optical device 102 is configured to have a projection 102b which is about the mid-way of the actuator wire 107 in order to allow a horizontal movement of the actuator 107 along the projection 102b resulting in a two-axis pendulum motion pattern.

Figure 7:
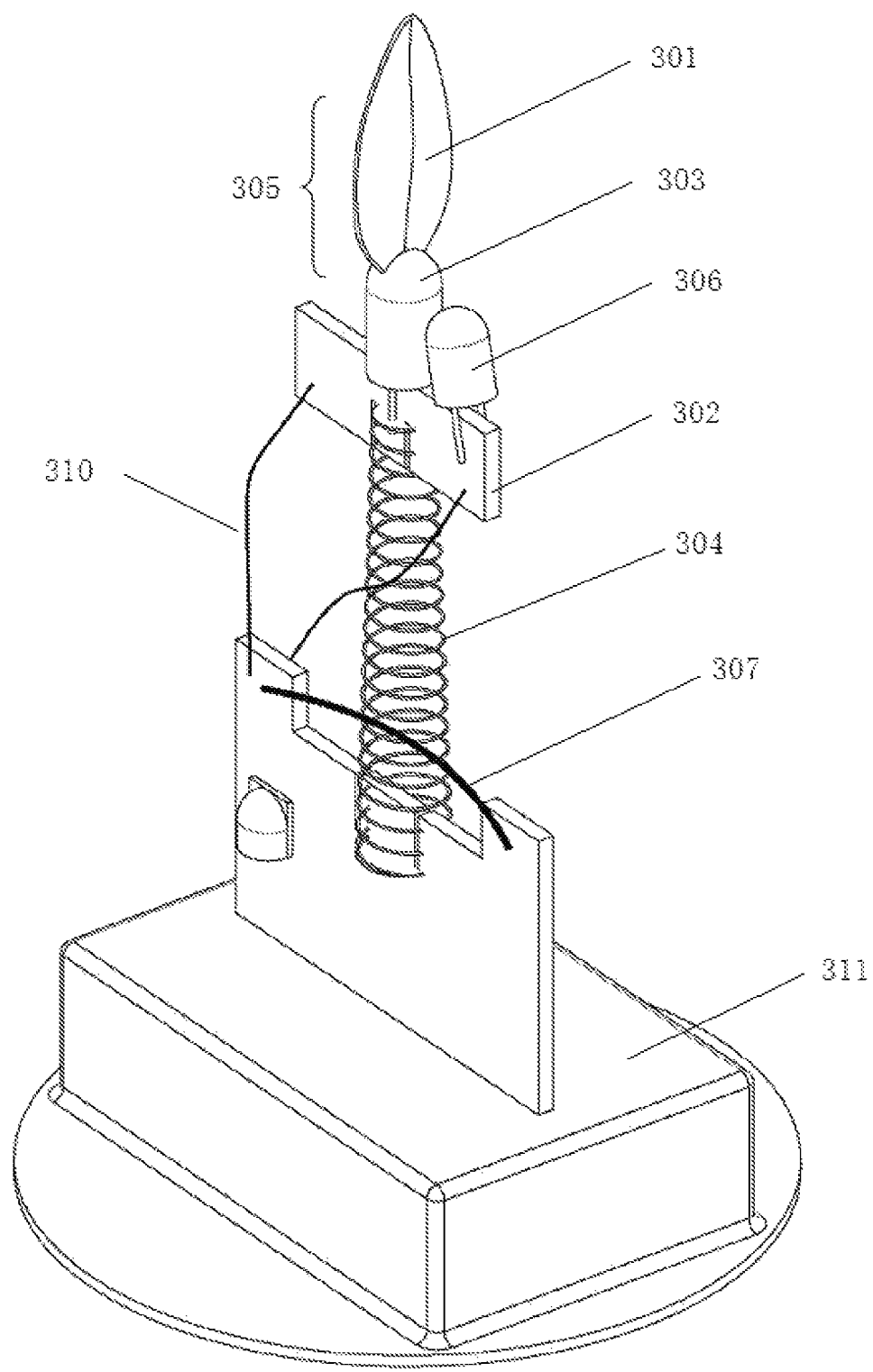
FIG. 7 is a perspective view of the flameless candle depicting the structure thereof according to a third implementation embodiment of the present invention.

FIG. 7 shows a third implementation embodiment of the present disclosure, which uses a different structural configuration to achieve a similar illumination effect of the candle flame enabled by the multiple light sources with light conduction and projection, and a similar flickering effect of the open candle flame motion by air flow in its surroundings enabled by the pendulum motion of the weight.

Like the first and second implementation embodiments, the third implementation embodiment also has a base 311 with a processor and a power source (not shown), and a holder with an opening at the top (not shown) and attached onto the base 311. In this third implementation embodiment, a candle frame unit 305 is provided which at least partly protrudes out of the holder through the opening. The candle frame unit 305 is transparent or translucent to light. In certain embodiments, the candle frame unit 305 diffuses, scatters and/or softens the incident light. In certain embodiments, the candle frame unit 305 comprises an upper flame display portion 301 and a lower flame display portion 303. The upper flame display portion 301 is generally a leaf-like illumination membrane, but other suitable shapes and/or structures mimicking the flame are also within the contemplation of the present disclosure. The upper flame display portion 301 comprises three zones resembling, from bottom to top, the hottest bottom violet-darkish zone around a candlewick, the most illuminated yellowish zone in the middle and the incomplete combustion zone at the top. The lower flame display portion 303 mimics a candlewick or a combination of a candle top and a candlewick. Inside the lower flame display portion 303, there is a first light source. The first light source can be an LED light. The LED light can be of any desirable shape or size. In certain embodiments, the brightness and/or color of the upper light source can be digitally controlled. In certain embodiments, there is also a light confinement device (not shown) inside the lower flame display portion 303. The light confinement device is attached to the first light source. In certain embodiments, the top of the first light source is received in the light confinement device, so that the light confinement device confines and directs most, if not all light from the first light source to illuminate the candle frame unit 305, particularly the leaf-like illumination membrane 301. In certain embodiments, the light confinement device is formed as a convex lens for producing a focused light from the first light source. The light confinement device is designed to be made of optical grade materials such as acrylic resin, polycarbonate, epoxies, or other optical lighting materials such as PMMA, PS, and ABS.

In certain embodiments, the lower flame display portion 303 rests on and is fixed to a supporting plate 302 for installation of the candle frame unit 305. In certain embodiments, there is a second light source 306 installed at the external of and around the lower flame display portion 303. In certain embodiments, the second light source 306 also rests on and is fixed to the supporting plate 302. The second light source 306 can be an LED light. The LED light can be of any desirable shape or size. In certain embodiments, the brightness and/or color of the upper light source can be digitally controlled. Light from the second light source 306 is projected onto the candle frame unit 305, particularly onto the leaf-like illumination membrane. As such, the combination of illuminations from the first light source and the second light source 306 displays a complete flame image including a flame and a candlewick on the candle frame unit 305.

The flickering effect of the open candle flame motion by air flow in its surroundings, in the third implementation embodiment of the present disclosure, is achieved by a truncated-cone-shape (TCS) helical spring support unit 304 in connection with a mechatronics based actuator 307. The TCS helical spring support unit 304 is attached to the base 311 at one end and to the supporting plate 302 at the other end. In certain embodiments, the TCS helical spring support unit 304 is received at least partly in two longitudinal slots of the supporting plate 302 at one end and in two longitudinal slots of the base 311 at the other end. Such configuration allows a dynamic waving motion of the candle frame unit 305. The waving motion is triggered by an actuating force exerted on the TCS helical spring 304 by a mechatronics based actuating mechanism 307. The mechanism 307 makes use of the properties of a bi-metal wire 307 such as nickel-titanium alloy known as Nitinol built by making use of combination of crystal structures from the nickel and titanium metals. The bi-metal wire 307 is able to contract when an electric current is applied and then to expand to its full length again once cooled down, or when disconnected from the power source. The degree and frequency of the contraction and expansion depend on the oscillation frequency and magnitude of the electric current applied to the bi-metal wire 307. In certain embodiments, in a sample size of 0.076 mm diameter bi-metal wire 307, it is capable of being shortened in length by about 5% in one second for a let-through current of 200 mA, and is capable of returning to its original length after the electric current is cut off for allowing its temperature to cool down. The explanation for these length changes lies at the atomic level as a result of the rearrangement of the crystal structures. The bi-metal wire 307 is associated with the TCS helical spring 304 so that the change in length of the bi-metal wire 307, i.e. the to and fro motion of the mechatronics based actuator 307 disturbs the equilibrium of the TCS helical spring supported unit 304, resulting the dynamic waving motion of the candle frame unit 305. In certain embodiments, a midpoint or a middle area of the bi-metal wire 307 is fixed to the TCS helical spring 304 so contraction or expansion of the bi-metal wire 307 will push or pull the TCS helical spring 304. In certain embodiments, the TCS helical spring 304 defines an internal volume. The bi-metal wire 307 comprises a microsphere fixed thereon and which is trapped within the internal volume of the TCS helical spring 304. Upon contraction or expansion of the bi-metal wire 307, the microsphere will push or pull the TCS helical spring 304.

In certain embodiments, the holder can encapsulate and protect the TCS helical spring support unit 304, the supporting plate 302, the second light source, the light confinement device, the mechatronics based actuator 307 and at lease part of the candle frame unit 305. The power source can provide power to the processor, and to the first and second light sources through wires 310 and to the mechatronics based actuator 307. In certain embodiments, the power source can comprise disposable batteries, rechargeable batteries, primary coils, power cord, or the like.

To control the brightness of the light sources 106, 110, 306 and align the "to-and-fro" dynamic motion of the mechatronics based actuator 107, 307 with the change of brightness of the light sources, the processor 109 comprises an integrated circuit (IC), e.g., an 8-pin IC, with a signal generator for generating a control signal, e.g., a programmable Pulse Width Modulation (PWM) signal, to activate or deactivate the mechatronics based actuator 107, 307 according to a preferred embodiment of the present invention.

The signal generator can provide a first control signal to manipulate the on-off duty of the electric current generated by the power source to the mechatronics based actuator 307. As discussed earlier, the on and off of the electric current can control the to-and-fro dynamic motion of the mechatronics based actuator 307, and consequently the waving motion of the TCS helical spring 304 and the candle frame unit 305. The signal generator can provide a second control signal to control the brightness and/or color of the upper and/or lower light source 306, 310. In certain embodiments, the first and second control signals are PWM signals. In certain embodiments, the first and second control signals are the same signal. In this regard, the waving motion of the candle frame unit 305 and the variation of brightness and/or color of the flame image displayed on the candle frame unit can be aligned. In certain embodiments, the first and second control signals are different signals, and the waving motion of the candle frame unit 305 and the variation of brightness and/or color of the flame image displayed on the candle frame unit can be aligned. In certain embodiments, the control signals can be generated based on pseudo-random numbers, pseudo-noise sequences, digital counters or whitening sequences.

In certain embodiments, the on-off duty cycle of the electric current to the mechatronics based actuator 307 is controlled by a PIC. The signal generator further comprises a voltage regulator for stabilizing an input from the power source to the PIC.

Figure 5:
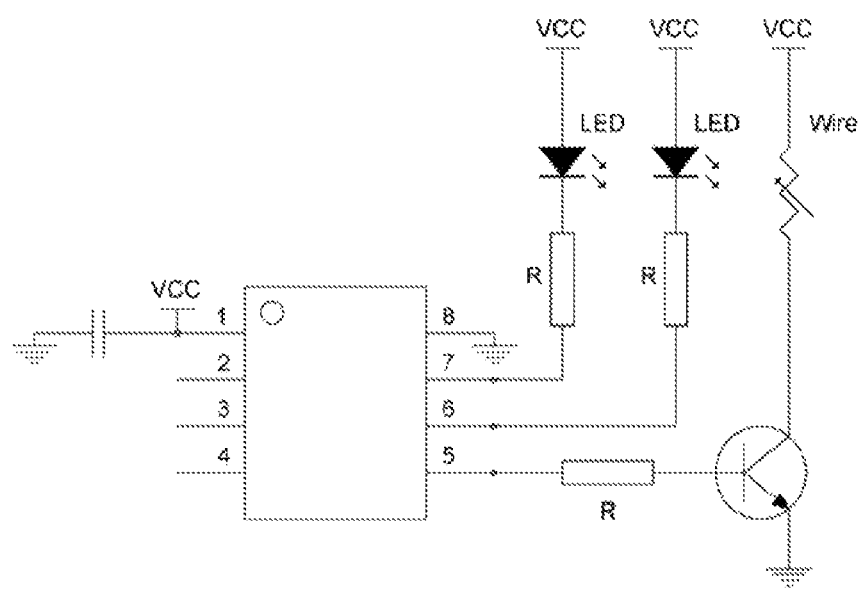
FIG. 5 is a circuit diagram depicting the electronic control unit for the LED light sources according to an embodiment of the present invention.

FIG. 5 shows a circuit diagram of the 8-pin IC of the processor 109:

Pin 1: for the power source 108, connected with a capacitor as voltage regulator to stabilize the voltage during operation of the device;

Pin 2 to Pin 4: for expandable features of the device;

Pin 5: for providing a programmable PWM signal, which in turn, enables a transistor network to activate/deactivate the alloy wire of the mechatronics based actuator 107 by an on-off duty cycle type of electric current;

Pin 6: for applying a pull-down signal to drive the first light source 106, and connected with a resistor for over-current protection;

Pin 7: for applying a pull-down signal to drive the second light source 110, and connected with a resistor for over-current protection;

Pin 8: as a common ground to the system.

By the signal generator of the present invention, the amount of brightness of the LED light source and its oscillations are governed based on a Linear Feedback Shift Register (LFSR) which serves to generate the control signal like pseudo-random numbers, pseudo-noise sequences, fast digital counters, and whitening sequences. As the average power delivered is proportional to the modulation duty cycle, the pulse train is designed with a sufficiently high modulation rate and filtered to produce the desired effect of the open candle flame.

While the foregoing invention has been described with respect to various embodiments, such embodiments are not limiting. Numerous variations and modifications would be understood by those of ordinary skill in the art. Such variations and modifications are considered to be included within the scope of the following claims.

What is claimed is:

1. A system for resembling an open candle flame comprising: a holder and a base, said holder comprising an optical device, a first light source, a flame display, a weight, and a mechatronics based actuator; said base comprising a second light source, a processor and a power source, wherein one end of said optical device is physically connected with said flame display and another end of said optical device is physically connected with said weight;

said mechatronics based actuator is positioned above said weight and capable to move horizontally along a projection extended from said optical device in order to provide a spinning dynamic motion for said optical device and said flame display;

said first light source is mounted at sidewall of the holder providing sideway illumination to said flame display while said second light source is positioned on said base providing upward illumination through said optical device to said flame display such that intensity of a flame image displayed on said flame display is a combination of said illuminations from the first light source and the second light source;

said mechatronics based actuator, said first light source, and said second light source are modulated by Pulse Width Modulation (PWM) signal generated from said processor such that dynamic motion of said mechatronics based actuator aligns with the variation pattern of brightness of the combined illuminations from the first and the second light sources, wherein said mechatronics based actuator is made of a bi-metal material, said bi-metal material comprises a nickel-titanium alloy configured in a wire form made by different crystal structures of nickel and titanium, wherein said optical device is configured to have a projection that allows a horizontal movement of the wire form of the mechatronic based actuator along the projection in order to result in a two-axis cone-shape pendulum motion towards the flame display.

2. The system of claim 1, wherein said optical device comprises a light guide and a convex lens for directing illuminations from said second light source to said flame display.

3. The system of claim 1, wherein said processor comprises a controlled signal generator for controlling an on-off duty cycle of electric current to generate the PWM signal in order to modulate the mechatronics based actuator, the first light source and the second light source.

4. The system of claim 2, wherein said light guide is made from optical grade material selected from a group consisting of acrylic resin, polycarbonate, epoxies, polymethylmethacrylate (PMMA), polystyrene (PS), and Acrylonitrile Butadiene Styrene (ABS).

5. A system for resembling an open candle flame comprising:

a base, the base comprises a processor and a power source;

a candle frame unit, the candle frame unit includes an upper flame display portion and a lower flame display portion;

a supporting plate on which the candle frame unit is mounted;

a truncate-cone-shape (TCS) helical spring support unit attached to the base at one end and to the supporting plate at the other end;

a first light source within the lower flame display portion, such that the first light source directs illumination to the candle frame unit;

a second light source around the lower flame display portion and on the supporting plate, such that the second light source projects illumination to the candle frame unit, wherein a complete flame image including an image of the flame and an image of a candlewick is displayed on the candle frame unit based on a combination of illuminations from the first light source and the second light source;

a mechatronics based actuator associated with the TCS helical spring support unit and configured to provide a push-pull triggering force for disturbing the equilibrium of the TCS helical spring support unit resulting a dynamic motion of the candle frame unit; and a holder attached to the base and enclosing the TCS helical spring support unit and at least part of the candle frame unit, wherein the mechatronics based actuator, the first light source and the second light source are powered by the power source and modulated by the processor such that the dynamic motion of the candle frame unit and the variation of brightness and/or color of the flame image can be aligned.

6. The system of claim 5, further comprising a light confinement device attached to the first light source and within the lower flame display unit, the light confinement device confines illumination from the first light source to the candle frame unit, and the light confinement device is made from optical grade material selected from a group consisting of acrylic resin, polycarbonate, epoxies, polymethylmethacrylate (PMMA), polystyrene (PS), and acrylonitrile butadiene styrene (ABS).

7. The system of claim 5, wherein the mechatronics based actuator is made of a bi-metal material.

8. The system of claim 5, wherein the processor comprises a signal generator, the signal generator provides a first control signal to control an on-off duty cycle of electric current to the mechatronics based actuator for controlling the dynamic motion of the candle frame unit, and a second control signal to control the brightness and/or color of the first and/or second light source.

9. The system of claim 5, wherein the upper flame display portion of the candle frame unit comprises an illumination membrane consisting of a violet-darkish bottom zone, a yellowish zone in the middle and an incomplete combustion zone at the top, and the lower flame display portion of the candle frame unit mimics a candlewick.

10. The system of claim 7, wherein the bi-metal material comprises a nickel-titanium alloy configured in a wire form made by different crystal structures of nickel and titanium.

11. The system of claim 8, wherein the first and second control signals are generated based on pseudo-random numbers, pseudo-noise sequences, digital counters or whitening sequences.

12. The system of claim 8, wherein the controlled signal generator further comprises a voltage regulator for stabilizing an input to a peripheral interface controller (PIC) for controlling the on-off duty cycle of electric current.

* * * * *